(12) United States Patent
Cao

(10) Patent No.: US 9,883,450 B2
(45) Date of Patent: Jan. 30, 2018

(54) NETWORK ACCESS METHOD AND MOBILE COMMUNICATION TERMINAL

(71) Applicant: GUANGDONG OPPO MOBILE TELECOMMUNICATIONS CORP., LTD., Dongguan (CN)

(72) Inventor: Jun Cao, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/647,908

(22) Filed: Jul. 12, 2017

(65) Prior Publication Data

US 2017/0311239 A1 Oct. 26, 2017

Related U.S. Application Data

(63) Continuation of application No. 15/490,546, filed on Apr. 18, 2017, which is a continuation of application No. PCT/CN2016/085890, filed on Jun. 15, 2016.

(30) Foreign Application Priority Data

Jun. 19, 2015 (CN) .......................... 2015 1 0346840

(51) Int. Cl.
*H04W 48/16* (2009.01)
*H04W 8/06* (2009.01)
(Continued)

(52) U.S. Cl.
CPC ............. *H04W 48/16* (2013.01); *H04W 8/06* (2013.01); *H04W 8/18* (2013.01); *H04W 8/26* (2013.01); *H04W 48/04* (2013.01)

(58) Field of Classification Search
CPC ...................................................... H04W 48/16
(Continued)

(56) References Cited

U.S. PATENT DOCUMENTS

2006/0211420 A1 9/2006 Ophir et al.
2007/0184825 A1 8/2007 Lim et al.
(Continued)

FOREIGN PATENT DOCUMENTS

CN 101657005 A 2/2010
CN 101827429 A 9/2010
(Continued)

OTHER PUBLICATIONS

First Office Action (including English translation) issued in corresponding Chinese Patent Application No. 201510346840.8, dated Jun. 27, 2016, 17 pages.
(Continued)

*Primary Examiner* — Michael T Vu

(57) ABSTRACT

A network access method and a mobile communication terminal are provided. The method includes the following steps: order information is acquired, the order information is parsed to acquire information of a visited place, a network identifier of a visited public land mobile network (VPLMN) is acquired when it is determined that the network identifier of the VPLMN is not stored in the EHPLMN list, and the network identifier of the VPLMN is added to the EHPLMN list. Network access is then performed according to the EHPLMN list.

6 Claims, 4 Drawing Sheets

(51) Int. Cl.
    *H04W 8/18*     (2009.01)
    *H04W 48/04*     (2009.01)
    *H04W 8/26*     (2009.01)

(58) Field of Classification Search
    USPC .................................................. 455/434–436
    See application file for complete search history.

(56) References Cited

U.S. PATENT DOCUMENTS

| | | |
|---|---|---|
| 2014/0342732 A1 | 11/2014 | Manalo et al. |
| 2016/0219503 A1* | 7/2016 | Kim ...................... H04W 48/20 |
| 2017/0041773 A1* | 2/2017 | Fujishiro ............... H04W 8/005 |

FOREIGN PATENT DOCUMENTS

| | | |
|---|---|---|
| CN | 104853404 A | 8/2015 |
| CN | 104853412 A | 8/2015 |
| CN | 104902459 A | 9/2015 |
| CN | 104980997 A | 10/2015 |
| EP | 1703752 A2 | 9/2006 |

OTHER PUBLICATIONS

International Search Report (including English translation) issued in corresponding International Application No. PCT/CN2016/085890, dated Jul. 26, 2016, 4 pages.

* cited by examiner

NETWORK ACCESS METHOD AND MOBILE COMMUNICATION TERMINAL

CROSS REFERENCE TO RELATED APPLICATIONS

This application is a continuation application of U.S. application Ser. No. 15/490,546, filed on Apr. 18, 2017, which is the U.S. continuation application of PCT Patent Application No. PCT/CN2016/085890, filed on Jun. 15, 2016, which claims priority to Chinese Patent Application No. 201510346840.8, filed on Jun. 19, 2015, the entire contents of all of which are hereby incorporated by reference in their entireties.

TECHNICAL FIELD

The present disclosure relates to mobile communication technical field, and particularly to a network access method and a mobile communication terminal.

BACKGROUND

Public land mobile networks (PLMNs) are networks established and operated by governments or operators authorized by the governments for the purpose of providing land mobile telecommunication services to the public. The PLMNs are usually interconnected with public switched telephone networks (PSTNs) to form a communication network of the whole area or whole country.

An identifier of the PLMN is generally a series of digital codes, for example, the PLMN network identifier of China Mobile is 46000, and the PLMN network identifier of China Unicom is 46001. Users can communicate conveniently and rapidly via mobile networks provided by operators. With the improvement of people's living standard, users carrying communication terminal devices to travel abroad or for business are becoming more and more. When roaming communication (for example, international roaming communication) is performed, a mobile communication terminal (for example, a mobile phone) of the user may need to perform network search to acquire the PLMN network identifier.

When the mobile communication terminal moves from a home to a visited place (for example, the mobile communication terminal moves from a home country to a visited country), the mobile communication terminal may need to access the PLMN of the current visited place. However, at present, what frequently occurs is that when the mobile communication terminal moves from a home to a visited place, the mobile communication terminal needs to take a long time (sometimes it may take a few minutes or more) to successfully access the PLMN of the current visited place, which affects user communication experience.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Persons skilled in the art can derive other accompanying drawings according to the described accompanying drawings without creative efforts.

Figure 1:
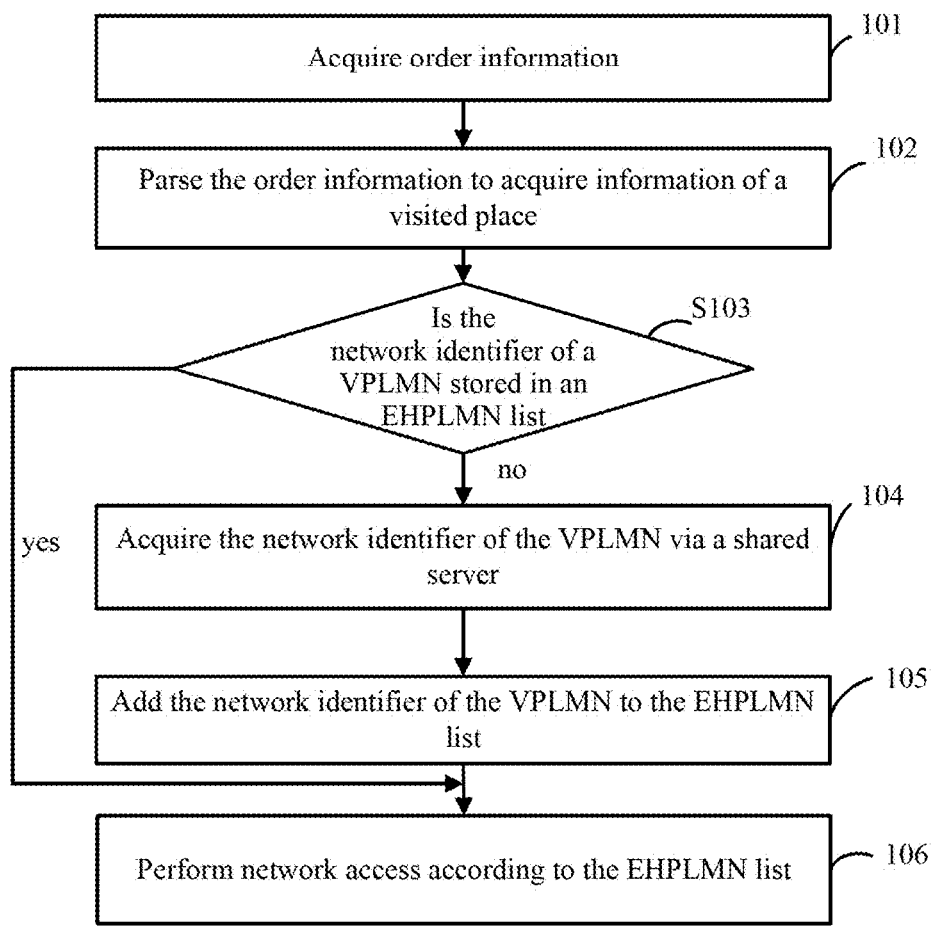
FIG. 1 is a flow chart of a network access method in accordance with a first method embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make a better understanding of technical solutions of the present disclosure by those skilled in the art, the technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by those skilled in the art without creative efforts based on the embodiments of the present disclosure shall fall within the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The embodiments will be described in detail below respectively.

Terms "first", "second", "third", "fourth", and so on used in the specification, appended claims, and accompanying drawings of the present disclosure are used to distinguish different objects rather than describe specific sequences. Additionally, terms "include", "have", and any deformation thereof are intended to cover non-exclusive inclusion relationship. For example, a process, method, system, product, or device including a series of steps or units is not limited to listed steps or units, and optionally, can include steps or units which are not listed, or optionally, can further include other inherent steps or units for the process, method, product, or device.

In the following, a public land mobile network (PLMN), a registered PLMN, an equivalent public land mobile network (EPLMN), an equivalent home public mobile network (EHPLMN), a visited public land mobile network (VPLMN) will be explained respectively.

The PLMNs are networks established and operated by the governments or operators authorized by the governments for the purpose of providing land mobile telecommunication services to the public. The PLMNs are usually interconnected with PSTNs to form a communication network of the whole area or whole country. PLMN=mobile country code (MCC)+mobile network code (MNC). For example, the PLMNs of China Mobile are 46000, 46002, 46007, and 46008, and the PLMNs of China Unicom are 46001, 46006, and 46009. The PLMNs are wireless communication systems intended for use by terrestrial subscribers on land (for example in vehicles or on foot). However, mobile and portable Internet subscribers are also becoming common. An ideal PLMN system provides corresponding services to mobile and portable subscribers and fixed networks, and it is a special challenge in areas of complex topography as it is difficult to find and maintain a base station. In an urban environment, many obstacles exist, for example, buildings and various radio frequencies can cause noise and interference of radiation.

The RPLMN is a PLMN registered before the mobile communication terminal is shut down or out-of-service last time. In the TSG TP-21 meeting of 3GPP in 2003, it is determined that the RPLMN is deleted from a universal subscriber identity module (USIM) card and will be stored in a memory of the terminal.

The EPLMN is a PLMN equivalent to a PLMN currently selected by the mobile communication terminal, and they have the same priority.

The EHPLMN is a local PLMN equivalent to the PLMN currently selected by the mobile communication terminal. Actually, the EHPLMN and EPLMN are similar to the 158 network newly established by China Mobile, and the PLMN is similar to the original 135~139 networks.

The HPLMN is a PLMN that a user of the mobile communication terminal belongs to. That is, the MCC and MNC contained in the international mobile subscriber identification (IMSI) number of the USIM card of the mobile communication terminal is the same as the MCC and MNC of the HPLMN. For a subscriber, there is only one HPLMN.

The VPLMN is a PLMN of the visited place of the user of the mobile communication terminal. The MCC and MNC of the VPLMN is not exactly the same as the MCC and MNC of the IMSI number of the SIM card. When the mobile communication terminal loses coverage, a VPLMN will be selected.

Embodiments of the present disclosure disclose a network access method and a mobile communication terminal. The network identifiers of the VPLMNs are added to an EHPLMN list in advance. When the mobile communication terminal performs network search at the current visited place, the probability that a network search hits a certain public land mobile network (PLMN) whose network identifier is stored in the EHPLMN list can be improved. Therefore, the probability that the mobile communication terminal accesses a network at the current visited place can be improved, which helps to reduce user communication waiting time and further helps to enhance user communication experience.

The mobile communication terminal can be any one or all of the following: smart phones, wearable devices (personal pivots), personal or mobile multimedia players, personal digital assistants (PDAs), laptop computers, tablet computers, smart books, handheld computers, and personal electronic devices similar to the above. The above mobile terminal can include a network interface, a processor, a memory, an audio processing circuit, a microphone, a camera, and can further include an internal or external audio amplifier and a loudspeaker unit coupled to the audio amplifier.

The following descriptions will briefly illustrate a network access method in accordance with an embodiment of the present disclosure. The network access method can include: acquiring order information; parsing the order information to acquire information of a visited place; acquiring the network identifier of a VPLMN when it is determined that the network identifier of the VPLMN is not stored in the EHPLMN list, and adding the network identifier of the VPLMN to the EHPLMN list; and performing network access according to the EHPLMN list.

In the embodiment, the network identifier of the VPLMN is added to the EHPLMN list in advance, therefore, the probability that the mobile communication terminal accesses a network at the current visited place is improved, which helps to reduce user communication waiting time.

Referring to FIG. 1, a network access method in accordance with a first method embodiment of the present disclosure is illustrated. As illustrated by FIG. 1, the network access method can begin at block 101.

At block 101, order information is acquired.

In the embodiment of the present disclosure, generally, users can book airline tickets through the web. When filling in booking information, a contact number and a contact E-mail address are usually required to be filled in, so that when the booked airline ticket is issued, the user can be informed that the booked airline ticket has been successfully issued. A specific implementation manner in which the mobile communication terminal acquires the order information can include the follows. When the mobile communication terminal receives a short message (for example, a short message, instant message information, an E-mail, and so on), the mobile communication terminal can parse the short message to determine whether the short message is likely to contain the order information. For example, when a user books an airline ticket over the "XXX" website, the "XXX" official website system sends a short message containing ticket issue information to the mobile communication terminal. The short message may contain "XXX", flight information, and other keywords. When the mobile communication terminal parses the short message and acquires the above keywords, the mobile communication terminal determines that the short message contains the order information, and acquires the order information of the short message. For example, the short message can be "[www.XXX.com] the ticket, June 24 23:45 to 05:35 on June 25, British Airline BA28777, Hong Kong airport to Heathrow airport, has been issued".

At block 102, the order information is parsed to obtain information of a visited place.

In the embodiment of the present disclosure, the mobile communication terminal parses the content of the order information to acquire the information of the visited place contained in the order information. For example, for the above order information, the information of the visited place is London, and the home is Hong Kong.

At block 103, whether the network identifier of a VPLMN is stored in an EHPLMN list is determined. When yes, proceed to block 106; otherwise, proceed to block 104.

In the embodiment of the present disclosure, the EHPLMN list contains the network identifier of the HPLMN and the network identifier of the VPLMN. The network identifier of the VPLMN is the network identifier of a PLMN of a visited place operator who has signed roaming agreements with the home operator of the SIM card of the mobile communication terminal. The mobile communication terminal can determine whether the network identifier of the VPLMN associated with the information of the visited place is stored in the EHPLMN list according to the information of the visited place acquired at block 102. For example, the information of the visited place acquired at block 102 is London, by detecting whether the EHPLMN list contains the VPLMN associated with London, the mobile communication terminal can determine whether the EHPLMN list has the network identifier of the VPLMN associated with the information of the visited place.

Figure 2:
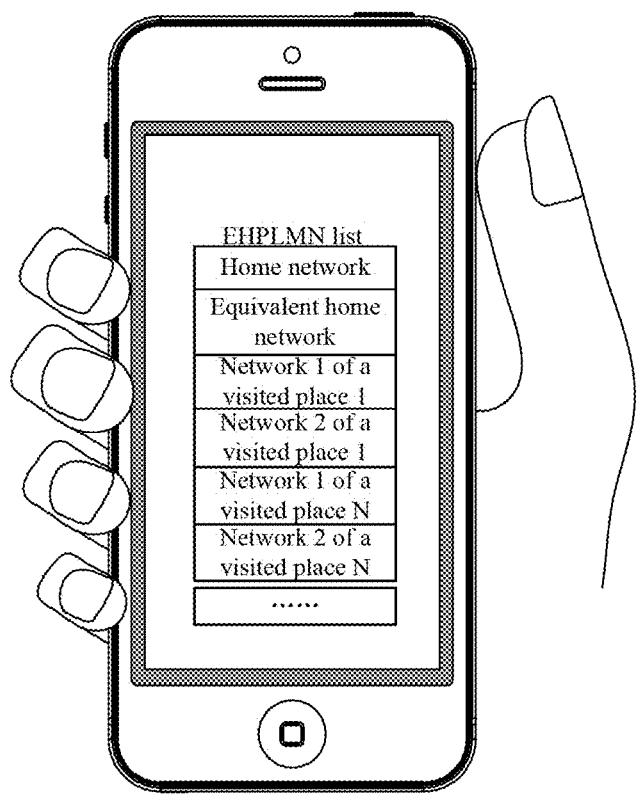
FIG. 2 is a schematic view of an EPLMN list in accordance with an embodiment of the present disclosure.

FIG. 2 is a schematic view of the EHPLMN list. The EPLMN is a PLMN equivalent to the PLMN currently selected by the user terminal, and they have the same priority. The EHPLMN is mainly used to solve user residence and roaming policies between a shared network and an original network. Operators can configure EPLMNs, and communication network resource sharing can be realized among the EPLMNs. From a business perspective, communication network resource sharing can be realized among network resources of different operators or different PLMNs defined by the same operator. The EHPLMN list can contain a network identifier of the HPLMN and the network identifier of the VPLMN added in advance, or the EHPLMN list can contain the network identifier of the HPLMN, the network identifier of the EHPLMN, and the network identifier of the VPLMN added in advance. The pre-added network identifier of the VPLMN is equivalent to the RPLMN registered before the mobile communication terminal is shut down or out-of-service last time, and they have the same priority.

At block 104, the network identifier of the VPLMN is acquired.

In the embodiment of the present disclosure, the manner in which the mobile communication terminal acquires the network identifier of the VPLMN can be that, the network identifier of the VPLMN is acquired by a shared server, or by receiving the network identifier of the VPLMN entered by a user, or by receiving the network identifier of the VPLMN transmitted by another mobile communication terminal, or the network identifier of the VPLMN can be acquired in other manners.

At block 105, the network identifier of the VPLMN is added to the EHPLMN list.

In the embodiment of the present disclosure, the manner in which the mobile communication terminal adds the network identifier of the VPLMN to the EHPLMN list can be that, the mobile communication terminal automatically adds the network identifier of the VPLMN to the EHPLMN list after the mobile communication terminal acquires the network identifier of the VPLMN; the manner can also be that the mobile communication terminal prompts the user whether to add the network identifier of the VPLMN to the EHPLMN list after the mobile communication terminal acquires the network identifier of the VPLMN. After receiving a user confirmation instruction for confirming to add the network identifier of the VPLMN to the EHPLMN list, the mobile communication terminal adds the network identifier of the VPLMN to the EHPLMN list. The mobile communication terminal can also add the network identifier of the VPLMN to the EHPLMN list in other manners.

At block 106, network access is performed according to the EHPLMN list.

In the embodiment of the present disclosure, when the mobile communication terminal performs network search at the visited place, the mobile communication terminal can perform network search according to network identifiers in the EHPLMN list. The mobile communication terminal can scan to acquire a network identifier of the VPLMN broadcasted by a base station. The mobile communication terminal can compare the network identifier of the VPLMN acquired by scanning with the network identifiers of the PLMNs in the EHPLMN list.

When the mobile communication terminal determines that the network identifier of the VPLMN broadcasted by a cell station matches with one network identifier in the EHPLMN list, the mobile communication terminal can initiate network registration, and establishes a communication connection with a network of the visited place.

In the embodiment of the present disclosure, the mobile communication terminal acquires the information of the visited place of the order information. When it is determined that the network identifier of the VPLMN is not stored in the EPHLMN list stored in the mobile communication terminal according to the information of the visited place, the mobile communication terminal acquires the network identifier of the VPLMN, and adds the network identifier of the VPLMN to the EHPLMN list. When the mobile communication terminal performs network search at the visited place, the mobile communication terminal performs network access according to the EHPLMN list. As the network identifier of the VPLMN is stored in the EHPLMN list, the probability that the network search hits a certain PLMN whose network identifier is stored in the EHPLMN list can be improved. Therefore, the probability that the mobile communication terminal accesses a network at the current visited place is improved, which helps to reduce user communication waiting time (ideally, the mobile communication terminal may only take a few seconds to complete network access), and further helps to enhance user communication experience.

In other implementations, the network access method can further include: acquiring current geographic position information of the mobile communication terminal; and determining whether the current geographic position information of the mobile communication terminal matches with the information of the visited place. Performing network access according to the EHPLMN list includes performing network access according to the EHPLMN list when it is determined that the current geographic position information of the mobile communication terminal matches with the information of the visited place.

Figure 3:
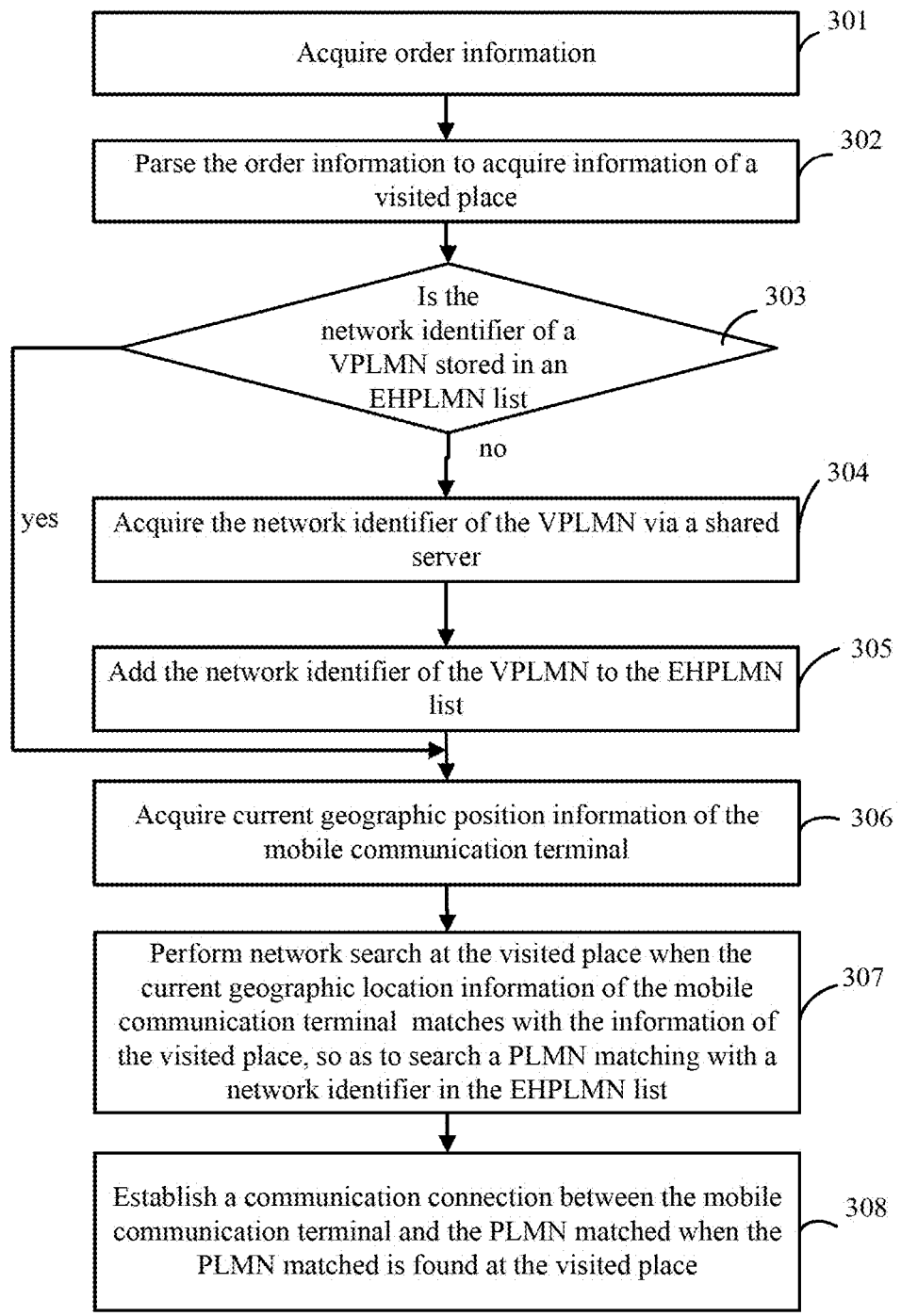
FIG. 3 is a flow chart of a network access method in accordance with a second method embodiment of the present disclosure.

Referring to FIG. 3, FIG. 3 is a flow chart of a network access method in accordance with a second method embodiment of the present disclosure. As illustrated by FIG. 3, the network access method can begin at block 301.

At block 301, order information is acquired. The process at block 301 can correspond to the process at block 101 of FIG. 1.

In the embodiment of the present disclosure, generally, users can book airline tickets through the web. When filling in booking information, a contact number and a contact E-mail address are usually required to be filled in, so that when the booked airline ticket is issued, the user can be informed that the booked airline ticket has been successfully issued. A specific implementation manner in which the mobile communication terminal acquires the order information can include the follows. When the mobile communication terminal receives a short message (for example, a short message, an instant message, an E-mail, and so on), the mobile communication terminal can parse the short message to determine whether the short message is likely to contain the order information. For example, when a user books an airline ticket over the "XXX" website, the "XXX" official website system sends a short message containing ticket issue information to the mobile communication terminal. The short message may contain "XXX", flight information, and other keywords. When the mobile communication terminal parses the short message and acquires the above keywords, the mobile communication terminal determines that the short message contains the order information, and acquires the order information of the short message. For example, the short message can be "[www.XXX.com] the ticket, June 24 23:45 to 05:35 on June 25, British Airline BA28777, Hong Kong airport to Heathrow airport, has been issued".

At block 302, the order information is parsed to acquire information of a visited place. The process at block 302 can correspond to the process at block 102 of FIG. 1

In the embodiment of the present disclosure, the mobile communication terminal parses the content of the order information to acquire the information of the visited place contained in the order information. For example, for the above order information, the information of the visited place is London, and the home is Hong Kong.

At block 303, whether the network identifier of a VPLMN is stored in an EHPLMN list is determined. When yes, proceed to step S306; otherwise, proceed to step S304. The process at block 303 can correspond to the process at block 303 of FIG. 1

At block 304, the network identifier of the VPLMN is acquired via a shared server.

In the embodiment of the present disclosure, a specific implementation manner in which the network identifier of the VPLMN is acquired via the shared server can be that, the mobile communication terminal logs into the shared server and acquires all shared network information containing the network identifier of the VPLMN, and the mobile communication terminal parses the acquired shared network information to acquire the network identifier of the VPLMN.

In another embodiment, a specific implementation manner in which the network identifier of the VPLMN is acquired via the shared server can also be that, the mobile communication terminal sends to the shared server an acquiring request for acquiring shared network information containing the network identifier of the VPLMN, receives the shared network information containing the network identifier of the VPLMN transmitted by the shared server in response to the acquiring request, and parses the shared network information to acquire the network identifier of the VPLMN.

In another embodiment, a specific implementation manner in which the network identifier of the VPLMN is acquired via the shared server can also be that, the mobile communication terminal sends to the shared server an acquiring request for acquiring the network identifier of the VPLMN, receives the network identifier of the VPLMN transmitted by the shared server in response to the acquiring request, so as to acquire the network identifier of the VPLMN.

At block 305, the network identifier of the VPLMN is added to the EHPLMN list. The process at block 305 can correspond to the process at block 105 of FIG. 1.

In the embodiment of the present disclosure, the manner in which the mobile communication terminal adds the network identifier of the VPLMN to the EHPLMN list can be that, the mobile communication terminal automatically adds the network identifier of the VPLMN to the EHPLMN list after the mobile communication terminal acquires the network identifier of the VPLMN; the manner can also be that the mobile communication terminal prompts the user whether to add the network identifier of the VPLMN to the EHPLMN list after the mobile communication terminal acquires the network identifier of the VPLMN. After receiving a user confirmation instruction for confirming to add the network identifier of the VPLMN to the EHPLMN list, the mobile communication terminal adds the network identifier of the VPLMN to the EHPLMN list. The mobile communication terminal can also add the network identifier of the VPLMN to the EHPLMN list in other manners.

At block 306, current geographic position information of the mobile communication terminal is acquired.

In the embodiment of the present disclosure, as the order information contains a specific time that the user may arrive at the visited place, the mobile communication terminal can acquire the current system time of the mobile communication terminal when the mobile communication terminal is turned on or the flight mode is turned off. If the current system time of the mobile communication terminal is close to (one hour earlier or two hours later) the specific time of arriving at the visited place recorded in the order information, for example, the specific time of arriving at the visited place recorded in the order information is June 25, 05:35, if the current system time of the mobile communication terminal is June 25, 06:35, the mobile communication terminal acquires the current geographic position information of the mobile communication terminal. A specific implementation manner in which the mobile communication terminal acquires the current geographic position information of the mobile communication terminal may be that, the mobile communication terminal acquires the geographic location information through a global positioning system.

That is, the above block 306 includes: parsing the order information to acquire the time information of arriving at the visited place; and acquiring the current geographic location information of the mobile communication terminal when it is determined that the absolute value of the time difference between the current system time of the mobile communication terminal and the time information of arriving at the visited place is less than a preset value.

The preset value can be set according to actual needs; for example, the preset value can be one hour, one and a half hour, two hours, three hours and so on. If the preset value is one hour, when it is determined that the current system time of the mobile communication terminal is one hour earlier or later than the time of arriving at the visited place, the geographic position information of the mobile terminal can be acquired.

At block 307, network search is performed at the visited place when the current geographic location information of the mobile communication terminal matches with the information of the visited place is determined, so as to search a PLMN matching with a network identifier in the EHPLMN list.

In the embodiment of the present disclosure, the mobile communication terminal compares the current geographic position information of the mobile communication terminal acquired at block S306 with the information of the visited place. When the mobile communication terminal determines that the current geographic position information of the mobile communication terminal matches with the information of the visited place, the mobile communication terminal automatically performs network search according to the EHPLMN list, it can also prompt the user to manually select to perform network search according to the EHPLMN list, and the mobile communication terminal can also adopt other manners to perform network search.

At block 308, a communication connection between the mobile communication terminal and the PLMN matched is established when the PLMN matched is found at the visited place.

In the embodiment of the present disclosure, the mobile communication terminal acquires the information of the visited place in the order information. When it is determined that the network identifier of the VPLMN is stored in the EPHLMN list stored in the mobile communication terminal according to the information of the visited place, the mobile communication terminal acquires the network identifier of the VPLMN, and adds the network identifier of the VPLMN to the EHPLMN list. When the mobile communication terminal determines that the current geographic position information of the mobile communication terminal matches with the information of the visited place, the mobile communication terminal performs network search and network access according to the EHPLMN list. As the network identifier of the VPLMN is stored in the EHPLMN list, the probability that the network search hits a PLMN whose network identifier is stored in the PLMN list can be improved. Therefore, the probability that the mobile communication terminal accesses a network at the current visited place can be improved, which helps to reduce user communication waiting time (ideally, the mobile communication terminal may only take a few seconds to complete network access), and further helps to enhance user communication experience.

Figure 4:
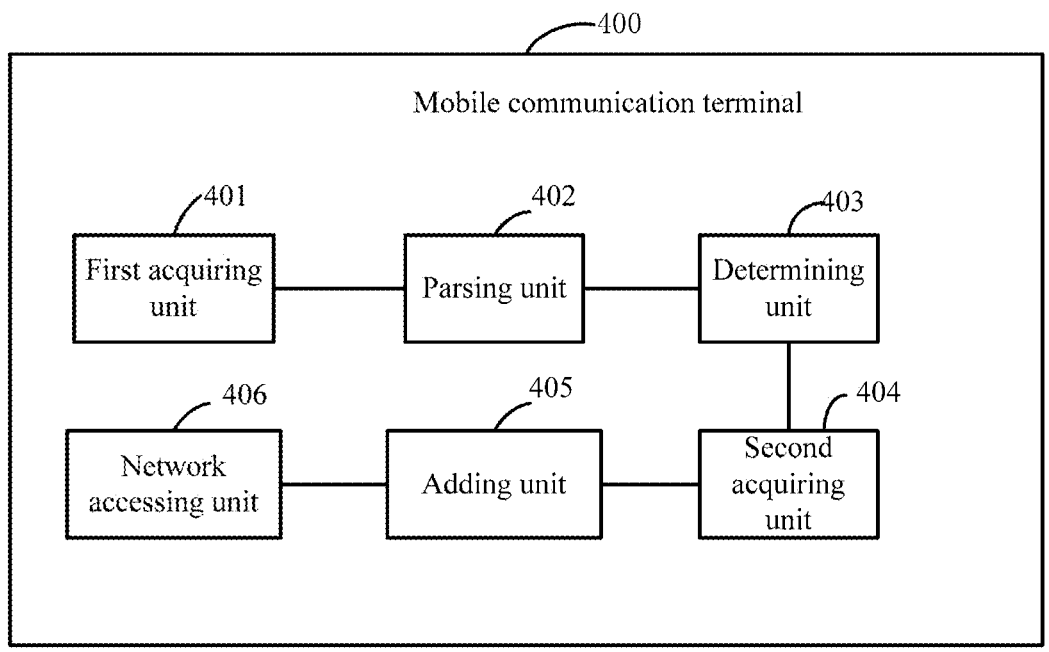
FIG. 4 is a structure diagram of a mobile communication terminal in accordance with a first apparatus embodiment of the present disclosure.

Referring to FIG. 4, FIG. 4 is a structure diagram of a mobile communication terminal 400 in accordance with an embodiment of the present disclosure. The mobile communication terminal 400 includes a first acquiring unit 401, a parsing unit 402, a determining unit 403, a second acquiring unit 404, an adding unit 405, and a network accessing unit 406. The first acquiring unit 401 and the second acquiring unit 404 can be respectively realized by acquiring circuits for example. The parsing unit 402 can be realized by a parser or a parsing circuit for example. The determining unit 403 can be realized by a determining circuit for example. The adding unit 405 can be realized by an adding circuit for example. The network accessing unit 406 can be realized by a network accessing circuit for example.

The first acquiring unit 401 is configured to acquire order information.

The first acquiring unit 401 is configured to acquire the network identifier of a VPLMN via a shared server, or receive the network identifier of the VPLMN entered by a user, or receive the network identifier of the VPLMN transmitted by another mobile communication terminal.

Specifically, the first acquiring unit 401 acquiring the network identifier of the VPLMN via the shared server can be realized in a number of manners. For example, the first acquiring unit 401 sends to the shared server an acquiring request for acquiring shared network information containing the network identifier of the VPLMN, receives the shared network information containing the network identifier of the VPLMN transmitted by the shared server in response to the acquiring request, and parses the shared network information to acquire the network identifier of the VPLMN.

The parsing unit 402 is configured to parse the order information acquired by the first acquiring unit 401 to acquire information of a visited place.

The determining unit 403 is configured to determine whether the network identifier of the VPLMN is stored in an EHPLMN list.

The second acquiring unit 404 is configured to acquire the network identifier of the VPLMN when the determining unit 403 determines that the network identifier of the VPLMN is not stored in the EHPLMN list.

The adding unit 405 is configured to add the network identifier of the VPLMN acquired by the second acquiring unit 404 to the EHPLMN list. The detailed manners in which the adding unit 405 adds the network identifier of the VPLMN to the EHPLMN list is similar to the manners described at block 105.

The network accessing unit 406 is configured to perform network access according to the EHPLMN list.

The network accessing unit 406 is configured to perform network search at the visited place, and when a VPLMN matching with a network identifier in the EHPLMN list is found at the visited place, the network accessing unit 406 is configured to establish a communication connection between the mobile communication terminal and the VPLMN matched.

In other implementations, the mobile communication terminal further includes a third acquiring unit (not illustrated) configured to acquire current geographic position information of the mobile communication terminal, and a detecting unit (not illustrated) configured to determine whether the current geographic location information of the mobile communication terminal acquired by the third detecting unit matches with the information of the visited place. The network accessing unit 406 is configured to perform network search according to the EHPLMN list when the detecting unit determines that the current geographic position information of the mobile communication terminal matches with the information of the visited place.

Optionally, the visited place and home are belonged to different countries or different districts.

Specifically, the third acquiring unit is configured to parse the order information to acquire the time information of arriving at the visited place, and acquire the current geographic location information of the mobile communication terminal when it is determined that the absolute value of the time difference between the current system time of the mobile communication terminal and the time information of arriving at the visited place is less than a preset value.

It can be understood that functions of various functional modules of the mobile communication terminal 400 of the present disclosure can be specifically realized according to the methods of the method embodiments, and for the specific realization process, reference can be made to the related descriptions of the method embodiments, which will not be repeated herein.

In the embodiment of the present disclosure, the parsing unit 402 parses the order information acquired by the first acquiring unit 401 to acquire the information of the visited place, and the determining unit 403 determines whether the network identifier of the VPLMN is stored in the EHPLMN stored in the mobile communication terminal according to the information of the visited place. When No, the second acquiring unit 404 acquires the network identifier of the VPLMN, and the adding unit 505 adds the network identifier of the VPLMN to the EHPLMN list. When the mobile communication terminal performs network search at the visited place, the mobile communication terminal performs network access according to the EHPLMN list. As the network identifier of the VPLMN is stored in the EHPLMN list, the probability that the network search hits a PLMN whose network identifier is stored in the PLMN list can be improved. Therefore, the probability that the mobile communication terminal accesses a network at the current visited place can be improved, which helps to reduce user communication waiting time (ideally, the mobile communication terminal may only take a few seconds to complete network access), and further helps to enhance user communication experience.

Figure 5:
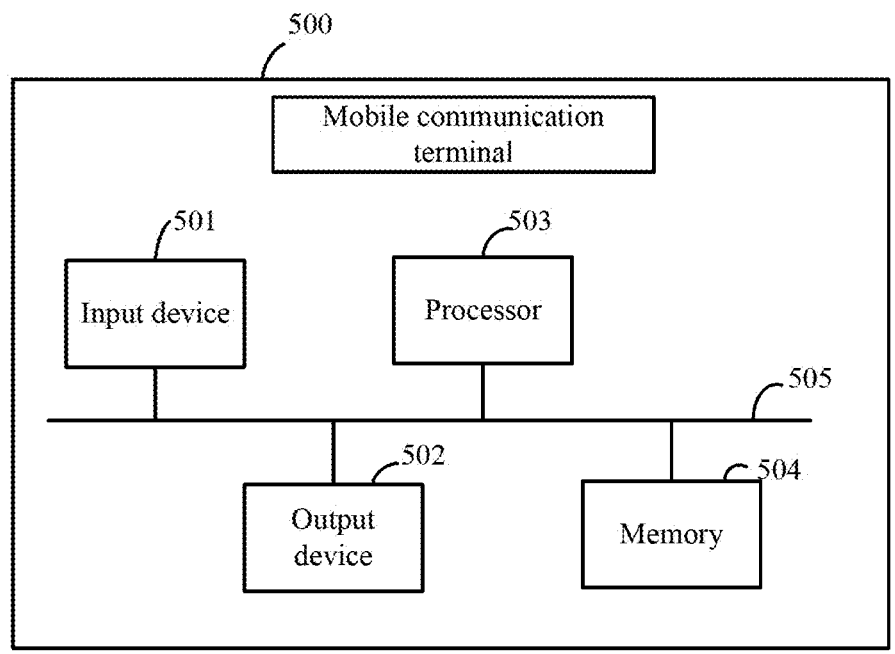
FIG. 5 is a structure diagram of a mobile communication terminal in accordance with a second apparatus embodiment of the present disclosure.

Referring to FIG. 5, FIG. 5 is a structure diagram of a mobile communication terminal 500 in accordance with an embodiment of the present disclosure. The mobile communication terminal 500 includes at least one input device 501, at least one output device 502, at least one processor 503 (for example, CPU), and a memory 504. The input device 501, the output device 502, the processor 503, and the memory 504 are coupled together via a bus 505.

The input device 501 can include a touch panel, a touch screen, and a keyboard.

The output device 502 can be a liquid crystal display (LCD), a light emitting diode (LED) display, an organic light-emitting diode (OLED) display, and so on, and is configured to output and display information.

The memory 504 can be a high-speed random-access memory, and can also be a non-volatile memory, for example a disc memory. The memory 504 stores a set of program codes. The processor 503 is configured to invoke the set of program codes stored in the memory 504 to perform the following operations: acquiring order information; parsing the order information to acquire information of a visited place; acquiring the network identifier of a VPLMN when it is determined that the network identifier of the VPLMN is not stored in the EHPLMN list, and adding the network identifier of the VPLMN to the EHPLMN list; and performing network access according to the EHPLMN list.

In the embodiment, as the network identifier of the VPLMN is added to the EHPLMN list in advance, therefore, the probability that the mobile communication terminal accesses a network at the current visited place is improved, which helps to reduce user communication waiting time.

In some practicable embodiments, the processor 503 is configured to invoke the set of program codes to perform the following operations to complete the operation of acquiring the network identifier of the VPLMN: acquiring the network identifier of the VPLMN via a shared server, or receiving the network identifier of the VPLMN entered by a user, or receiving the network identifier of the VPLMN transmitted by another mobile communication terminal.

In some practicable embodiments, the processor 503 is configured to invoke the set of program codes to perform the following operations to complete the operation of acquiring the network identifier of the VPLMN via the shared server: sending to the shared server an acquiring request for acquiring shared network information containing the network identifier of the VPLMN; receiving the shared network information containing the network identifier of the VPLMN transmitted by the shared server in response to the acquiring request; and parsing the shared network information to acquire the network identifier of the VPLMN.

In some practicable embodiments, the processor 503 is configured to invoke the set of program codes to perform the following operations to complete the operation of performing network access according to the EHPLMN list: performing network search at the visited place to search a PLMN matching with a network identifier in the EHPLMN list; and establishing a communication connection between the mobile communication terminal and the PLMN matched when the PLMN matched is found at the visited place.

In some practicable embodiments, the processor 503 is configured to invoke the set of program codes to perform the following operation to complete the operation of performing network access according to the EHPLMN list: initiating network registration with a network identifier broadcasted by a base station when the network identifier broadcasted by the base station matches with the network identifier of the VPLMN that is contained in the EHPLMN list, and establishing a communication connection with a network of the visited place.

In some practicable embodiment, the processor 503 is further configured to invoke the set of program codes to perform the following: acquiring current geographic position information of the mobile communication terminal; and determining whether the current geographic location information of the mobile communication terminal matches with the information of the visited place. Performing network search according to the EHPLMN list includes performing network access according to the EHPLMN list when it is determined that the current geographic position information of the mobile communication terminal matches with the information of the visited place.

In some practicable embodiments, the processor 503 is configured to invoke the set of program codes to perform the following operations to complete the operation of acquiring the current geographic position information of the mobile communication terminal: parsing the order information to acquire the time information of arriving at the visited place; and acquiring the current geographic location information of the mobile communication terminal when it is determined that the absolute value of the time difference between the current system time of the mobile communication terminal and the time information of arriving at the visited place is less than a preset value.

In some practicable embodiments, the visited place and home are belonged to different countries or different districts.

In specific implementation, the input device 501, the output device 502, and the processor 503 described in the embodiment of the present disclosure can execute the implementation manners described in various embodiments of the network access methods provided by the embodiments of the present disclosure, and can also execute the implementation manner of the terminal described in the first embodiment of the mobile communication terminal provided by the embodiment of the present disclosure, which will not be repeated herein.

Furthermore, based on the network access method provided by the embodiment illustrated by FIG. 1 or FIG. 3, the present disclosure further provides a non-volatile computer storage medium storing one or more programs. When the one or more programs are executed by a mobile communication terminal, the mobile communication terminal executes the network access method illustrated by FIG. 1 or FIG. 3.

The modules or sub-modules of all embodiments of the present disclosure can be realized by a universal integrated circuit, for example, a central processing unit (CPU), or an application specific integrated circuit (ASIC).

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

According to actual needs, the order of the steps of the methods in the embodiments of the present disclosure can be adjusted, some steps can be merged into one step, and some step can be deleted.

According to actual needs, some units of the terminals in the embodiments of the present disclosure can be merged into one unit, some unit can be divided into several units, and some unit can be deleted.

Those skilled in the art can understand that all or a part of procedures can be accomplished by using a computer program to instruct related hardware. The program can be stored in a computer-readable storage medium. When the program is executed, the procedures of the embodiments of the above-mentioned methods can be included. Wherein, the storage medium can be a magnetic disk, an optical disk, a ROM (Read-Only Memory, ROM), a RAM (Random Access Memory, RAM), or the like.

The embodiments described above are merely preferred ones of the present disclosure but are not limitations to the protection scope of the present disclosure, thus equivalent variations made according to the appended claims of the present disclosure still fall within the scope of the present disclosure.

What is claimed is:

1. A network accessing method, comprising:
   acquiring, by a mobile communication terminal, order information;
   parsing, by the mobile communication terminal, the order information to acquire information of a visited place;
   determining, by the mobile communication terminal, whether the public land mobile network (PLMN) network identifier of the visited place is stored in an equivalent home public land mobile network (EHPLMN) list;
   acquiring, by the mobile communication terminal, the PLMN network identifier of the visited place when it is determined that the PLMN network identifier of the visited place is not stored in the EHPLMN list, and adding the PLMN network identifier of the visited place to the EHPLMN list;
   acquiring, by the mobile communication terminal, current geographic position information of the mobile communication terminal;
   determining, by the mobile communication terminal, whether the current geographic location information of the mobile communication terminal matches with the information of the visited place; and
   performing, by the mobile communication terminal, network access according to the EHPLMN list when it is determined that the current geographic position information of the mobile communication terminal matches with the information of the visited place,
   wherein performing network access according to the EHPLMN list by the mobile communication terminal comprises:
   searching network at the visited place by the mobile communication terminal that is moved to the visited place; and
   when the PLMN of the visited place matching with a network identifier of the EHPLMN list is found at the visited place, establishing a communication connection between the mobile communication terminal and the matched PLMN of the visited place.

2. The method of claim 1, wherein acquiring the PLMN network identifier of the visited place by the mobile communication terminal comprises one of the following:
   acquiring, by the mobile communication terminal, the PLMN network identifier of the visited place via a shared server; and
   receiving, by the mobile communication terminal, the PLMN network identifier of the visited place entered by a user.

3. The method of claim 1, wherein the visited place and home are belonged to different countries or different districts.

4. A mobile communication terminal, comprising:
   a first acquiring unit configured to acquire order information;
   a parsing unit configured to parse the order information acquired by the first acquiring unit to acquire information of a visited place;
   a determining unit configured to determine whether the public land mobile network (PLMN) network identifier of the visited place is stored in an equivalent home public land mobile network (EHPLMN) list;
   a second acquiring unit configured to acquire the PLMN network identifier of the visited place when the determining unit determines that the PLMN network identifier of the visited place is not stored in the EHPLMN list;
   an adding unit configured to add the PLMN network identifier of the visited place acquired by the second acquiring unit to the EHPLMN list;
   a third acquiring unit configured to acquire current geographic position information of the mobile communication terminal;
   a detecting unit configured to determine whether the current geographic location information of the mobile communication terminal acquired by the third acquiring unit matches with the information of the visited place; and
   a network accessing unit configured to perform network access according to the EHPLMN list when the detecting unit determines that the current geographic position information of the mobile communication terminal matches with the information of the visited place, wherein the network accessing unit is configured to search network at the visited place by the mobile communication terminal that is moved to the visited place, and when the PLMN of the visited place matching with a network identifier of the EHPLMN list is found at the visited place, the network accessing unit is configured to establish a communication connection between the mobile communication terminal and the matched PLMN of the visited place.

5. The mobile communication terminal of claim 4, wherein the second acquiring unit is configured to acquire the PLMN network identifier of the visited place via a shared server, or receive the PLMN network identifier of the visited place entered by a user.

6. The mobile communication terminal of claim 4, wherein the visited place and home are belonged to different countries or different districts.

* * * * *